S. CHENEY.
AIR RAILWAY BRAKE.
APPLICATION FILED OCT. 18, 1915.
1,219,253. Patented Mar. 13, 1917.
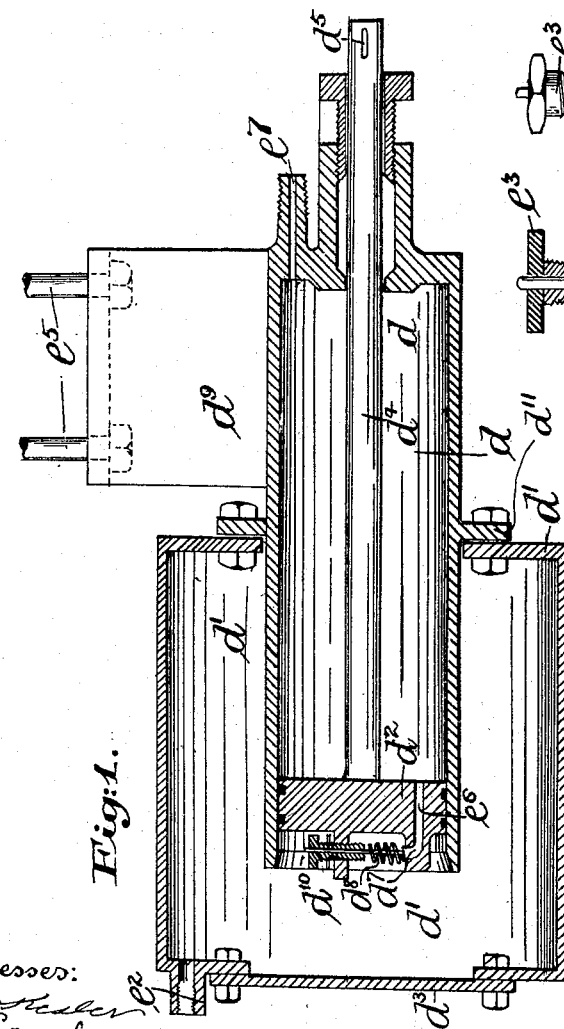

UNITED STATES PATENT OFFICE.

SAMUEL CHENEY, OF WICKEPIN, WESTERN AUSTRALIA, AUSTRALIA.

AIR RAILWAY-BRAKE.

1,219,253.  Specification of Letters Patent.  Patented Mar. 13, 1917.

Original application filed December 30, 1913, Serial No. 809,550. Divided and this application filed October 18, 1915. Serial No. 56,544.

*To all whom it may concern:*

Be it known that I, SAMUEL CHENEY, a subject of the King of Great Britain, and residing at Wickepin, Western Australia, Commonwealth of Australia, have invented certain new and useful Improvements in Air Railway-Brakes, of which the following is a specification.

These improvements in or relating to railway brakes of the compressed air type, as shown in my application, Serial No. 809,550, of which this is a divisional application, have for their object the provision of means whereby effective differential air pressures operate on both sides of the piston respectively.

By means of this present invention I effect said differential air pressures, said means comprise a non-return excess pressure valve which is carried on the auxiliary reservoir side of the piston, said valve controlling an air port formed in the piston and through which port air passes from the cylinder into the said reservoir.

This non-return valve is provided with a spring which urges it to its closed position and is also provided with a tension nut operating on said spring and whereby superior pressure is effected on the rod side of the piston.

These differential air pressures operate on both sides of the working brake piston but having the predetermined superior pressure maintained on the rod side of said piston that is when the train air pipe is charged to its maximum working pressure. Upon the reduction of pressure in the train air pipe and therefore on the rod side of the brake piston, a resultant superior pressure is effected on the reservoir side of said piston so causing the application of the brakes. These improvements further permit of a graduated application of the brakes owing to the reduction of pressure on the rod side of the piston and the resultant superior pressure on the reservoir side thus compelling the piston to move forward out of the position shown in Fig. 1, so that the rod $d^4$ actuates the thereto connected brake gear proportionately with the reduction.

It therefore is obvious that the brakes can also be gradually released in proportion with the restoration of air pressure within the train air pipe, said pressure being operative against the rod side of the piston thus counteracting the pressure on the reservoir side of said piston in proportion to the restored pressure in the train air pipe.

Further these improvements comprise means whereby an imprisoned body of air within the reservoir is rendered permanently operative against such side of the working brake piston. Said means consist of an open mouthed cylinder which communicates with the said reservoir said cylinder having a piston carrying the said non-return valve.

The construction and use of these improvements will now be explained with the aid of the attached drawings wherein:—

Figure —1— is a side sectional elevation of the cylinder and air reservoir. Fig. —2— is a back view with reservoir cover removed. Fig. —3— is detail view of knuckle connecting piston rod to brake rods. Figs. —4— and —5— are respectively section and elevation views of reservoir valve for maintaining any predetermined pressure of air in reservoir. Referring to said drawings these improvements comprise a cylinder $d$ secured by the flange $d^{11}$ to the annular air reservoir $d^1$ and said cylinder by preference makes entry thereinto as seen in Fig. —1—.

The cylinder $d$ is open mouthed at the reservoir end and allows the piston $d^2$ to be withdrawn when the cover $d^3$ of the reservoir is removed. The piston rod $d^4$ has a knuckle joint $d^5$ see Fig. —3— whereby operative connection is made by rod $d^6$ to the usual brake gear.

On the back of the piston $d^2$ is carried a non-return excess pressure valve $d^7$ controlled by tension spring $d^8$ and whereby air is fed to the reservoir $d^1$ through the cylinder $d$ by the port or duct $e^6$ from the train air pipe connection $e^7$. The duty of this tensional valve $d^7$ is to permit of a lesser pressure in the reservoir $d^1$ than that operating on the front of the piston $d^2$ when the train air pipe is charged to its maximum working pressure and so prevents the brakes from being applied as such valve $d^7$ is set by the tension spring $d^8$ and nut $d^{10}$ in order to effect the superior pressure on the rod side of the piston $d^2$.

This piston $d^2$ is only operative when the train air pipe is punctured or is opened by any cause for application of the brakes. The branch $e^7$ communicates with the ordinary train air pipe. The cylinder $d$ is suspended from the vehicle by brackets $d^9$ and bolts $e^5$.

The tensional escape valve $e$ see Fig. —4— allows air to escape from the annular reservoir $d^1$ and maintains a predetermined pressure in said annular reservoir. This valve $e$ by its stem $e^1$ interscrews with the nipple $e^2$ formed on the reservoir $d^1$. The tension is effected by means of adjustment screw stud $e^3$ and tensional spring $e^4$ which maintains the valve $e$ home on its seat see Fig. —4—.

The valve casing is formed with air exit ports $e^9$.

The reservoir $d^1$ is provided with the cover $d^3$ made removable by bolts as shown and by means of said cover access is had to the back of piston $d^2$ and its valve $d^7$ see Fig. —1—.

What I claim as my invention and desire to secure by Letters Patent is —:—

1. A device of the character described comprising, a casing formed with an opening in one end, a cylinder having an open end extended into said casing through said opened end thereof, a flange projecting outwardly from said cylinder at a substantially central portion thereof and adapted to form an air-tight joint to close said open end of the casing, means for securing said flange to the wall of the casing, a piston head in said cylinder, a rod extending from said piston head through the outer end of said cylinder, said piston head having a passage therein for communicating said casing with the rod-side of said cylinder, and a spring pressed valve carried by said piston head for normally closing said passage and preventing the passage of fluid from said casing to the cylinder, said cylinder being formed with an inlet at its outer end for admitting fluid pressure to the cylinder.

2. A device of the character described comprising, a casing having an opening in opposite ends thereof, a cylinder having one end open and the other end closed, the open end of said cylinder extending into said casing through one of the open ends of the latter, a flange projecting outwardly from said cylinder at a substantially central portion thereof and fitted to engage with the wall of said casing to form an air-tight joint, means for securing said flange to said casing, a piston head disposed in said cylinder, a rod extending from said piston head through the closed end of said cylinder, said piston head being formed with a passage for communicating the rod-side of the cylinder chamber with said casing, an adjustable spring pressed valve carried on the piston head and adapted to normally close said passage and to prevent the passage of fluid from said casing to the rod-side of said cylinder, said cylinder being formed with an inlet in the closed end thereof for admitting fluid-pressure into the cylinder, an automatic escape valve in said casing for controlling the pressure therein, and a plate removably secured to the opposite open end of the casing.

In testimony whereof I have hereunto set my hand in presence of two subscribing witnesses.

SAMUEL CHENEY.

Witnesses:
U. W. BURKE,
RICHARD SPARROW.